Nov. 5, 1963  G. W. HICKS, JR  3,109,452
CHEMICAL INJECTOR
Filed March 13, 1962

GEORGE W. HICKS, JR.
INVENTOR.

BY
Robert K. Rhea
AGENT

United States Patent Office 3,109,452
Patented Nov. 5, 1963

3,109,452
CHEMICAL INJECTOR
George W. Hicks, Jr., 826 NE. 65, Oklahoma City, Okla.
Filed Mar. 13, 1962, Ser. No. 179,332
5 Claims. (Cl. 137—564.5)

The present invention relates to the art of producing oil wells and more particularly to a device for injecting an emulsion breaker into the fluid produced by an oil well.

Most pumping oil wells produce a combination of oil, water and gas, wherein a large proportion of the oil produced is mixed with the water which forms an emulsion. The water component produced by oil wells has no economic value and it is desirable to separate the water from the well fluids prior to the storage and processing of the oil. Oil wells are conventionally pumped by means of a reciprocating sucker rod type pump which tends to thoroughly mix the oil, basic sediment and water produced by the well from the various producing strata thereby creating the emulsion of oil and water. This emulsion if of such consistency that the oil and water are not easily separated without the addition and mixing with a chemical referred to herein as an emulsion breaker.

It is common practice to inject a conventional emulsion breaker into the fluid contained flow lines of oil wells adjacent the well head which facilitates separation of the oil and water by gravity in a separating tank located remotely from the well head. It has been common practice to inject such an emulsion breaker by means of a mechanically driven pump actuated by the oil well power surface unit which operates the pump. This type of chemical injector ordinarily has a reservoir of limited size and frequently gets out of order due to their constant operation and delicate structure thereby requiring frequent attention and repair or replacement.

It is, therefore, the principal object of the present invention to provide a device for injecting an emulsion breaker into well fluids forced through a flow line which will have an extended service life and which requires a minimum of attention.

A similarly important object is to provide a device of this class which will insure a positive flow of emulsion breaker into the well fluids without the use of mechanically actuated moving parts.

Still another object is to provide a device of this class which is aided in operation by gas or liquid pressure normally present in the produced well fluids and wherein the emulsion breaker will not be diluted by the well fluids mixing with the emulsion breaker.

A further object is to provide a device of this class which will increase the economy of separation of oil and water components of an emulsion produced by oil wells.

The present invention accomplishes these and other objects by providing an upright gas-tight tank which is supported by and is in communication with a flow line through which oil well fluids are pumped. A gas-tight emulsion breaker containing housing is connected in spaced relation to the tank above the flow line. A piston horizontally divides the housing. The upper end of the housing is connected by tubing to the upper end of the tank while other tubing, connected to the lower end of the housing, extends downwardly through the tank and into the flow line.

Other objects will be apparent from the following description when taken in conjunction with the accompanying single sheet of drawings, wherein.

Like characters of reference designate like parts in those figures of the drawings in which they occur.

In the drawings.

Figures 1, 2, 3, 4:
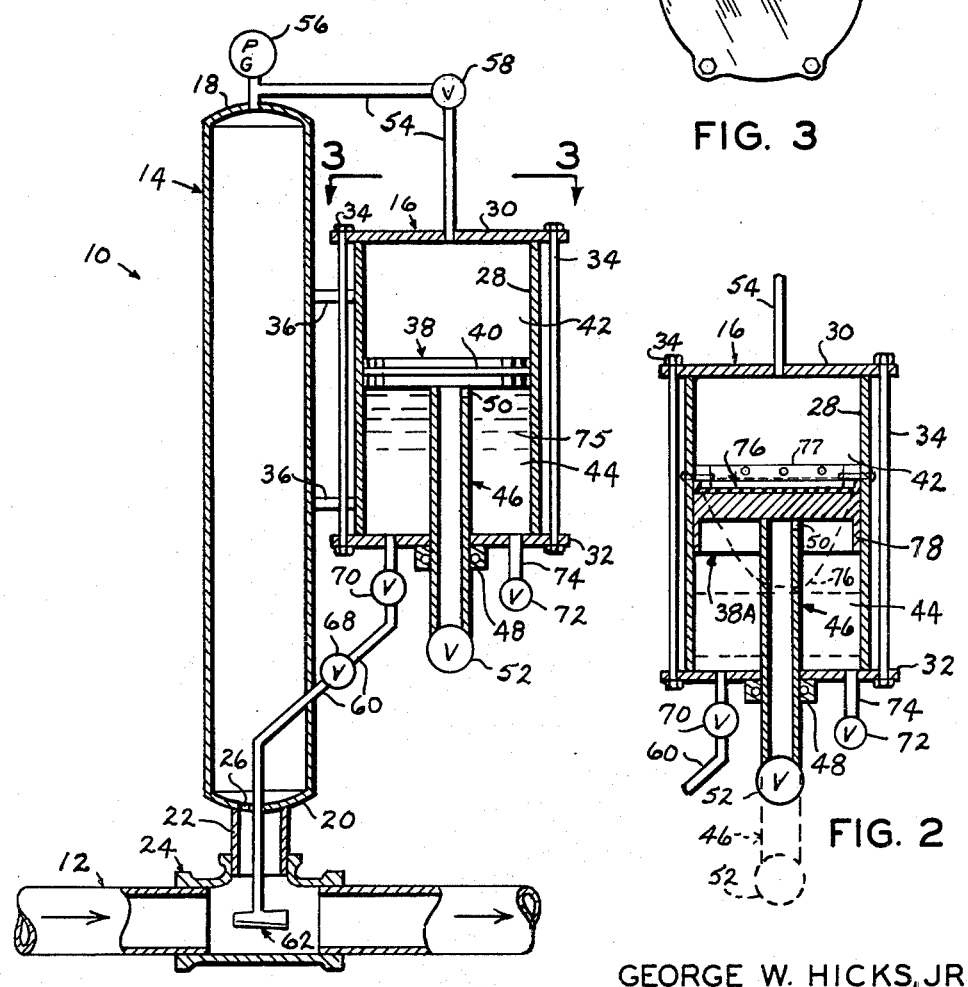
FIGURE 1 is a vertical cross-sectional view, partly in elevation, of an emulsion breaker injecting device installed on a fragment of a flow line.
FIGURE 2 is a vertical cross-sectional view of a modified form of the emulsion breaker containing housing.
FIGURE 3 is a top plan view of the housing taken substantially along the line 3—3 of FIG. 1.
FIGURE 4 is a vertical cross-sectional view, to an enlarged scale, of the depending end portion of the emulsion breaker injecting line installed in a flow line.

Referring more particularly to FIG. 1, the reference numeral 10 generally indicates an emulsion breaking injecting apparatus mounted on a flow line 12 through which the fluid mixture from one or more oil wells is pumped to a suitable settling tank or oil and water separating apparatus, not shown. The apparatus 10 as described here is installed on a particular oil well adjacent the well head, not shown, but it will be understood that the device 10 may be installed at any other suitable location for serving a plurality of wells, providing the device 10 is installed upstream from the point at which the oil and water is to be separated before processing.

The device 10 principally comprises a gas and liquid tank 14 and a housing 16. The tank 14 is cylindrical in general configuration having closed opposing ends 18 and 20. The end 20 is connected to a short nipple 22 which is in turn connected to a T 24, or the like, installed in the flow line 12. The end 20 is provided with a small aperture 26 within the limits of the nipple 22 which permits communication between the flow line 12 and the tank 14.

The housing 16 includes a cylindrical shape portion defined by a wall 28 closed at its upper and lower limits by end members 30 and 32, respectively. The end members 30 and 32 project outwardly of the circumference of the wall 28 for cooperatively receiving a plurality of elongated bolts and nuts 34. Suitable gaskets, not shown, are interposed between the respective end members 30 and 32 and the housing wall 28. Support members 36 connect the housing to the tank 14 in spaced-apart relation.

A piston 38 is slidably positioned within the housing and seals with the wall thereof by suitable packing such as an O-ring 40. The piston 38 divides the housing into an upper compartment 42 and a lower compartment 44. A centrally bored piston rod 46 is connected to the lower surface of the piston 38 and is slidably received through a suitable aperture formed in the bottom plate 32. A packing gland 48 is connected to the outer surface of the plate 32 and provided with suitable packing such as an O-ring to seal fluid tight with a peripheral portion of the piston rod. Adjacent its connection with the piston 38, the piston rod 46 is provided with a small aperture 50 for communication between the bore of the piston rod and the lower compartment 44 of the housing. The depending end of the piston rod 46 is closed by a valve or petcock 52 for the purposes which will be more fully explained hereinbelow.

Tubing 54 is connected at one end to the tank end 18 and connected at its other end to the upper housing plate 30 for communication between the tank 14 and the housing compartment 42. A suitable pressure gage 56 is connected to the tubing 54 to indicate fluid pressure within the tank 14. A valve 58 is interposed in the line 54 between the tank 14 and the housing plate 30.

A feeder pipe or drain line 60 is connected to the housing plate 32 and extends angularly downward through the wall of the tank 14, through the tank end plate 20 and terminates axially of the flow line 12 where a short length of tubing 62 is perpendicularly connected to the depending end of the line 60. The tubing 62 has a reduced forward end portion 64 directed upstream of the well fluids and is divergingly tapered rearwardly to form an enlarged rearward end portion 66 to create a Venturi tube effect. A suitable cut-off valve 68 is interposed in the line 60 between the tank 14 and housing plate 32. A sight feed or graduated dial valve 70 is similarly interposed in the line 60 between the cut-off valve 68 and housing plate 32. A conventional quick connection valve 72 is connected to the bottom plate 32 by a nipple 74 for filling the housing chamber 44 with a selected conventional emulsion breaking compound indicated by the line 75.

Referring more particularly to FIG. 2, an alternate embodiment of the housing 16 is illustrated. The alternate embodiment includes a similar cylindrical wall portion 28 closed by opposing end plates 30 and 32 secured by bolt and nut means 34. A diaphragm 76 is secured by a ring and rivets 77, or the like, to the inner surface of the wall 28 at a selected location between the housing ends 30 and 32. A piston 38A is slidably positioned within the housing below the diaphragm 76. The piston 38A is characterized by a depending circumferential skirt portion 78. A similarly formed valve equipped piston rod 46 is similarly connected to the piston 38A and is slidably received through the lower plate 32 of the packing gland 48.

Operation

In operation the device 10 is installed on the flow line 12 as described hereinabove with the valves 58 and 68 closed. Gas normally present in fluids produced by a well fills the tank 14 through the aperture 26, and its pressure is indicated by the pressure gage 56. The lower chamber 44 of the housing 16 is filled with the chemical 75 from a suitable reservoir under air pressure, not shown. In order for the piston 38 to rest on the chemical 75, the valve 52 is opened to bleed off any air or gas contained by the housing chamber 44 through the piston rod opening 50. The valve 58 is then opened permitting the gas within the tank 14 to fill the upper chamber 42 of the housing. The valve 68 is opened and the rate of feed valve 70 is adjusted to permit a selected quantity of the chemical 75 to enter the drain line 60. Fluid, not shown, pumped by the well through the flow line 12 passes through and around the tube 62, thus tending to reduce the pressure within the lower end portion of the drain line 60 which tends to draw the chemical 75 out of the line 60 and into the flow line as the well fluid is pumped through the latter.

The volume of chemical 75 displaced by the piston rod 46 creates an unbalanced pressure effect between the chambers 44 so that gas pressure within the upper chamber 42, in cooperation with gravitational attraction for the piston and its rod, tends to force the piston 38 downwardly against the chemical 75 to insure positive feeding of the latter into the flow line 12.

The rate of feeding of the chemical 75 can be determined visually by the rate of feed valve 70 and by marks or lines, not shown, printed on the periphery of the piston rod which will indicate the volume of chemical injected into the flow line in a given period of time.

Operation of the alternate embodiment illustrated in FIG. 2, is similar to that described hereinabove except that as the fluid 75 is drained out of the housing 16, gas pressure entering the upper compartment 42 forces the diaphragm 76 downwardly wherein a portion of the diaphragm remains in contact with the upper surface of the piston 38A and precludes any possibility of gas, oil or water entering the lower compartment 44 to dilute the chemical and lower its efficiency as an emulsion breaker.

Obviously the invention is susceptible to some change or alteration without defeating its practicability, and I therefore do not wish to be confined to the preferred embodiment shown in the drawings and described herein, further than I am limited by the scope of the appended claims.

I claim:
1. In combination with a flow line through which a mixture of oil, gas and water is pumped and wherein the flow line has a horizontally extending portion; a vertical gas-tight tank connected to and communicating with said flow line, said tank having an orifice in its lower end for the passage of gas from said flow line into said tank; a gas-tight housing supported by said tank above said flow line; tubing interconnecting the upper end portions of said tank and said housing; a drain line connected with the lower end portion of said housing and extending downwardly through the lower end portion of said tank into said flow line; a piston dividing said housing to form an upper gas containing compartment and a lower emulsion breaker containing compartment; a piston rod connected with said piston and extending downwardly from said housing through the lower end thereof; and sight feed valve means interposed in said drain line for regulating the flow of emulsion breaker therethrough.

2. The combination as set forth in claim 1 in which a relatively short length of tubing is secured to the depending end of said drain line with the longitudinal axis of said short length of tubing perpendicular to the longitudinal axis of the depending end portion of said drain line and coaxial with said flow line.

3. The combination defined in claim 2 in which the forward open end of said short length of tubing is substantially equal diametrically with respect to said drain line and said short length of tubing is characterized by a rearwardly diverging wall forming a rearwardly open end diametrically greater than said drain line.

4. The combination defined in claim 1 and a diaphragm circumferentially secured to the inner wall of said housing intermediate its ends and contiguously contacting the uppermost surface of said piston.

5. In combination with a flow line through which a mixture of oil, gas and water is pumped and wherein the flow line has a horizontally extending portion; a vertical gas-tight tank connected to said flow line, said tank having an orifice in its lower end for the passage of gas from said flow line into said tank; a gas-tight housing supported by said tank above said flow line; tubing and valve means interconnecting the upper end portions of said tank and said housing permitting the passage of gas from said tank into said housing; a drain line connected with the lower end portion of said housing and extending downwardly through the lower end portion of said tank into said flow line; a relatively short length of tubing secured to the depending end of said drain line with the longitudinal axis of said short length of tubing perpendicular to the longitudinal axis of the depending end portion of said drain line and coaxial with said flow line; a piston dividing said housing to form an upper gas containing compartment and a lower emulsion breaker containing compartment; a piston rod connected with said piston and extending downwardly from said housing through the lower end thereof; and rate of feed valve means interposed in said drain line for regulating the flow of emulsion breaker therethrough.

References Cited in the file of this patent
UNITED STATES PATENTS

| | | |
|---|---|---|
| 549,479 | Hall | Nov. 5, 1895 |
| 607,562 | Almstead | July 19, 1898 |
| 2,206,089 | Gray | July 2, 1940 |